United States Patent [19]

Kato et al.

[11] Patent Number: 5,109,958
[45] Date of Patent: May 5, 1992

[54] BRAKE UNIT FOR AN ELEVATOR HOIST APPARATUS

[75] Inventors: Kunio Kato; Yasumasa Iida; Takenobu Honda; Kazuhiko Sugita; Shinji Yamasaki, all of Inazawa, Japan

[73] Assignee: Mitsubishi Denki Kabushiki Kaisha, Japan

[21] Appl. No.: 596,709

[22] Filed: Oct. 11, 1990

[30] Foreign Application Priority Data

Oct. 13, 1989 [JP] Japan .................. 1-265137

[51] Int. Cl.⁵ .................................. B66B 11/04
[52] U.S. Cl. .................................. 187/20; 187/73
[58] Field of Search .................. 187/73, 32, 33, 28, 187/34, 35, 20

[56] References Cited

U.S. PATENT DOCUMENTS 2,676,673  4/1954  Bouton ...................... 187/32
4,108,280  8/1978  Eastcott et al. ........... 187/20

FOREIGN PATENT DOCUMENTS 859527   1/1961  United Kingdom .
1473464  4/1975  United Kingdom .
2108223  10/1982 United Kingdom .

*Primary Examiner*—Robert P. Olszewski
*Assistant Examiner*—Kenneth Noland
*Attorney, Agent, or Firm*—Leydig, Voit & Mayer

[57] ABSTRACT

A brake unit for an elevator hoist apparatus for use with an electric motor output shaft includes a brake disc mounted to the motor output shaft and a pair of brake arm assemblies each having a spring-biased pivotable brake arm and a brake shoe attached to one end of the brake arm for frictional engagement with the brake disc. The electromagnetic actuator is connected to the other end of the brake arms for separating the brake shoes from the brake disc against the braking springs. Each brake spring is a coil spring having a longitudinal axis extending parallel to the motor output shaft, whereby the brake unit can be made compact.

3 Claims, 4 Drawing Sheets

BRAKE UNIT FOR AN ELEVATOR HOIST APPARATUS

BACKGROUND OF THE INVENTION

This invention relates to a brake unit for an elevator hoist apparatus.

FIGS. 1 and 2 show a conventional elevator hoist apparatus and more particularly a brake unit therefor. In the figures, reference numeral 1 indicates a passenger car of an elevator, 2 indicates a hoist rope supporting the elevator car 1, and 3 indicates a drive pulley around which the hoist rope 2 is wound for driving the hoist rope 2 upwardly and downwardly. The drive pulley 3 is driven by a drive source such as an electric motor 4 through an unillustrated gear unit. Reference numeral 5 is a guide pulley for positioning a counterweight 6.

Also, 7 indicates a brake unit mounted on a drive shaft 8 between the motor 4 and the gear unit. The brake unit 7 usually prevents the rotation of the drive shaft 8 except when the elevator car is travelling. 9 indicates a fixed structure such as a building which supports the gear unit and the drive rope pulley 3.

The brake unit 7 will now be as a brake unit for a hoist apparatus, the brake unit 7 usually is a drum brake, structure of which is generally as illustrated in FIGS. 1 and 2 and 4.

In the figures, reference numeral 10 indicates a brake drum secured to the drive shaft 8, about which brake shoes 11 capable of engaging and separating with respect to an outer circumference thereof are attached to brake arms 13 rotatable about a pivot 12. The brake arms 13 are biased at the side remote from the pivot 12 by springs 14 which cause the brake arms 13 to be urged toward each other or, more particularly, cause the brake shoes 11 attached to the brake arms 13 to be pressed against the outer circumferential surface of the brake drum 10. Also provided on the side of the brake arm remote from the pivot 12 is an electromagnet 15 for opening the brake arms 13 against the biasing force of the springs 14.

Since the conventional brake unit 7 is constructed as described above, the brake drum 10 is not usually rotatable because of the spring braking force of the spring 14 applied through the brake arms 13 and the brake shoes 11, so that the elevator car 1 cannot move up and down. Also, when it is desired to drive the elevator car 1 up and down, the electromagnet 15 is energized, whereby the operating lever of the electromagnet 15 causes the brake arms 13 to rotate open about the pivots 12 against the spring force of the springs 14, so that the brake shoes 11 are separated from the brake drum 10 to release the brake and allow free rotation of the drive shaft 8, so that the elevator car 1 can be driven up and down by the motor 4.

Since the brake unit for an elevator hoist apparatus is constructed and operated as described above, the brake drum 10 is mounted to the drive shaft 8 of the motor 4 and has a long length because its outer circumferential surface is used as the braking surface, so that the axial length of the gear box 16 containing the motor 4, the brake apparatus 7 and the gear unit is large. This may cause a clearance defined between the gear box and the wall surface of the building 9 to become too narrow to achieve a reasonably easy maintenance. Also, since the springs 14 project perpendicularly relative to the axis of the drive shaft 8, the distance to the wall surface of the building 9 is small, so that the installation and maintenance of the springs 14 are difficult, and also the brake shoes 11 must be made large because of the limitation imposed on the brake surface, and the brake arms must disadvantageously be made correspondingly large.

SUMMARY OF THE INVENTION

Accordingly, one object of the present invention is to provide a brake unit for an elevator hoist apparatus which is free from the above discussed problems.

Another object of the present invention is to provide a brake unit for an elevator hoist apparatus in which the axial length of the drive force source, the gear box and the brake unit can be reduced.

Another object of the present invention is to provide a brake unit for an elevator hoist apparatus in which the projection of the springs in the direction perpendicular to the axial direction of an elevator is eliminated.

Still another object of the present invention is to provide a brake unit for an elevator hoist apparatus which is compact.

A brake unit for an elevator hoist apparatus of the present invention is characterized by a disc brake having at least one set of brake shoes capable of engaging with and separating from both the surfaces of a brake disc concentrically mounted on an input shaft extending from a drive source, and brake arms each carrying a brake shoe at one end thereof and the other end thereof being biased by a spring compressed and extended in the same direction as the input shaft.

According to the present invention, the brake unit for an elevator hoist apparatus for use with an electric motor output shaft comprises a brake disc which has two braking surfaces and which is mounted to the motor output shaft for rotation therewith and a pair of brake arm assemblies each having a movable brake arm and a brake shoe thereon. The brake arm assemblies are movably disposed in the vicinity of the brake disc for selective braking engagement at the brake shoes with the braking surfaces of the brake disc. The brake unit also comprises a pair of brake springs for biasing the brake shoes on the brake arms toward the braking surface of the brake disc and an actuator connected to the brake arms for separating the brake shoes from the brake disc against the action of the braking springs. The brake springs may be compression coil springs having a longitudinal axis extending parallel to the motor output shaft. The brake arms each may be connected to a lever pivotally supported in the vicinity of the second end of the brake arm, and the lever may have a first end operatively connected to the actuator means and a second end engageable with the second end of the brake arm.

According to the brake unit of the present invention, since a disc brake is employed, the distance between the drive force source and the gear box can be decreased, and since the springs are disposed along the axis of the drive shaft, the springs do not project in the direction perpendicular to the axis of the drive shaft, and since the brake shoes, the brake arms, etc. can be made small, the installation space for the brake unit can be decreased and it is easy to provide a space necessary for maintenance.

BRIEF DESCRIPTION OF THE DRAWINGS

The present invention will become more readily apparent from the following detailed description of the preferred embodiments of the present invention considered in conjunction with the accompanying drawings, in which.

DESCRIPTION OF THE PREFERRED EMBODIMENTS

Figure 1:
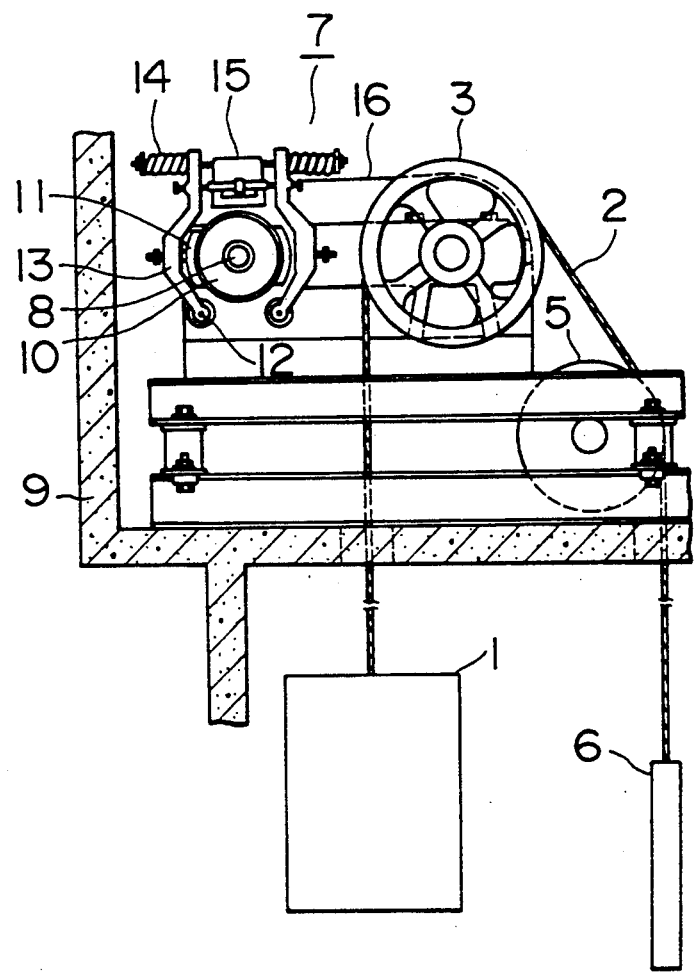
FIG. 1 is a side view of a brake unit for an elevator hoist apparatus of one embodiment of the present invention.
Figure 2:
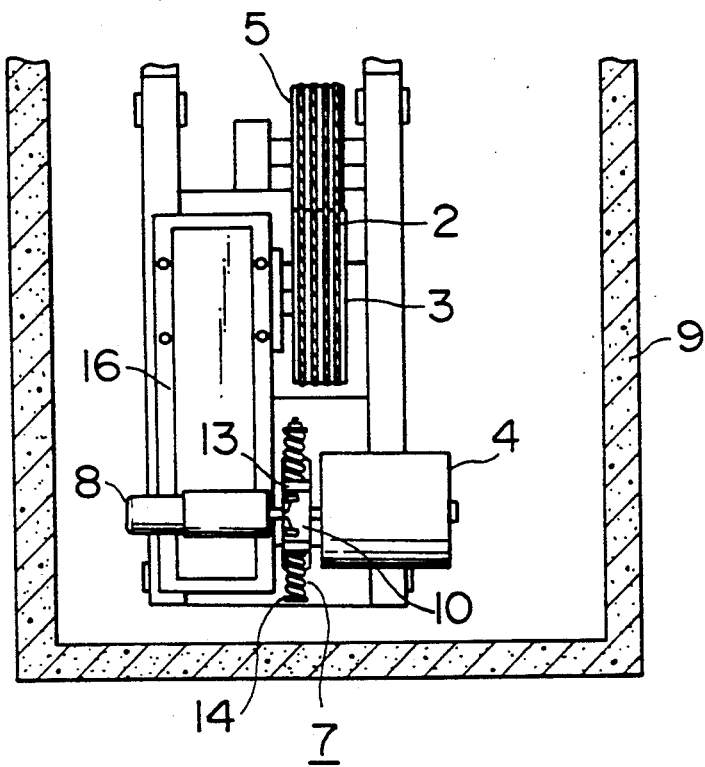
FIG. 2 is a plan view of FIG. 1.

The present invention will now be described in terms of the figures illustrating one embodiment of the present invention. Those components indicated by reference characters 3, 4, 8 and 16 are identical or similar to those of the conventional design.

Figure 3:
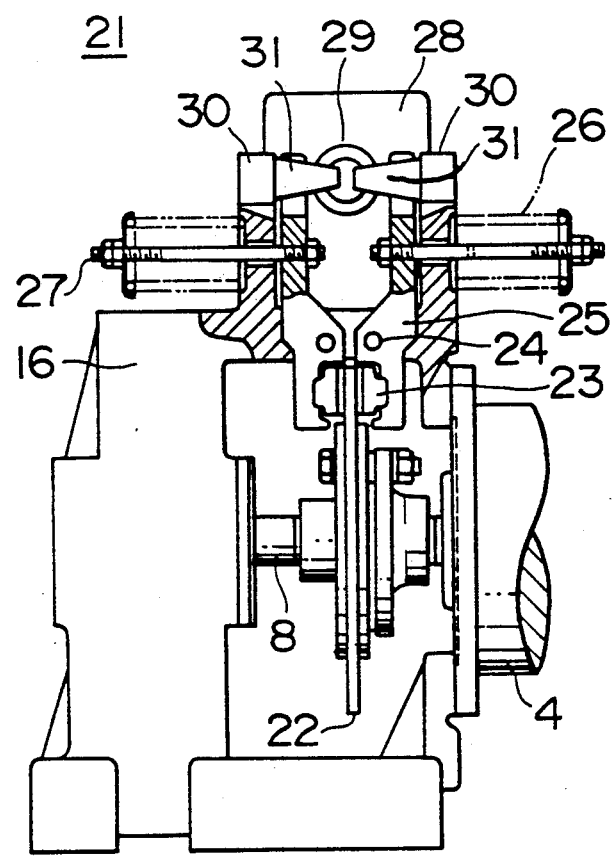
FIG. 3 is a side view of a conventional brake unit for an elevator hoist apparatus.
Figure 4:
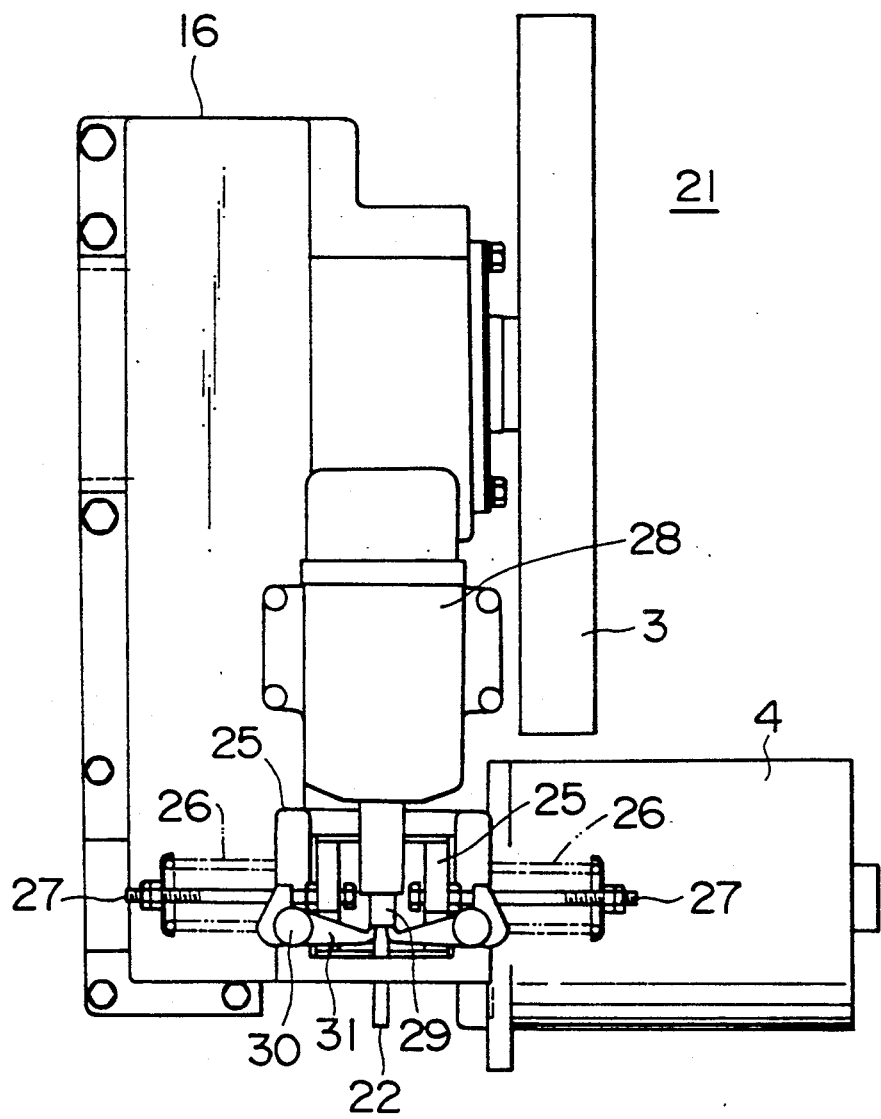
FIG. 4 is a plan view of FIG. 3.

In FIGS. 3 and 4 in which the brake unit 21 alone is illustrated, a brake disc 22 is concentrically secured to the drive shaft 8 between the motor 4 which is the drive power source and the gear box 16. On both sides of the peripheral edge of the brake disc 22, at least one set of separable brake shoes 23 is disposed. The brake shoes 23 are attached at one end of the brake arms 25, each of which is pivotted at its middle portion by a pin 24 so as to be movable in a direction perpendicular to the side surfaces of the brake disc 22.

On the other side of the brake arm 25 opposite to the brake shoe 23 relative to the pin 24, an inner end of a spring support rod 27 for supporting an outer end of a spring 26 is supported at its inner end by the gear box 16. The brake arms 25 usually act to press the brake shoes 23 against the brake disc 22 by the spring force of the spring 26.

Reference character 28 indicates an electromagnet which when energized actuates a plunger 29 actuated upon which is constructed to actuate in the direction perpendicular to the axis of the drive shaft 8.

The tip of the plunger 29, is arranged to act on one end of a lever 31 rotatable about a pivot 30 on the gear box 16, the other end of the lever 31 being in abutment with the side of the brake arm 25 at which the spring rod 27 is attached so that the brake shoes 23 attached to the brake arms 25 move away from the brake disc 22 against the spring force of the spring 26.

The operation of the embodiment of FIGS. 3 and 4 will now be described.

First, when the elevator car is not operated and at a complete stop, the electromagnet 28 is not energized and the lever 31 is not urged, so that the brake arms 25 press the brake shoes 23 against the brake disc 22 under the spring force of the spring 26. Therefore, the drive shaft 8 is locked and not allowed to rotate, so that the elevator car does not travel up and down.

Contrary to this, when it is desired to move the elevator car upwardly and downwardly, the electromagnet 28 is energized to cause the plunger 29 to project to push one end of the lever 31, whereby the lever 31 rotates about the pivot 30, the other end of the lever 31 pushing the brake arm 25 at the side opposite to the brake shoe 23 against the spring force of the spring 26 to pivot the brake arm 25 about the pin 24. Therefore, the brake shoes 23 attached at one end of the brake arms 25 separate from both sides of the brake disc 22, making the brake disc 22 or the drive shaft 8 freely rotatable, whereby the drive force from the motor 4 is transmitted to the drive rope pulley 3 through the gear unit to move the elevator car upwardly and downwardly.

Generally, the electromagnet 28 is energized simultaneously with the energization of the motor 4 and deenergized simultaneously with current interruption.

As has been described, the brake unit for an elevator hoist apparatus of the present invention comprises a disc brake having at least one set of brake shoes capable of engaging with and separating from both side surfaces of a brake disc concentrically mounted to an input shaft extending from a drive power source, and brake arms each carrying a brake shoe at one end thereof and the other end thereof being biased by a spring compressed and extended in the same direction as the input shaft. Therefore, the length of the brake unit along the drive shaft can be made small, and the springs can also be provided along the same shaft, so that the springs do not project in the direction perpendicular to the direction of the axis of the shaft. Further, since the brake unit is a disc brake, a sufficiently large braking surface can be obtained and the brake shoes and the brake arms can be made small, allowing the overall dimension of the brake unit to be made small.

What is claimed is:

1. A brake unit for an elevator hoist apparatus for use with an electric motor output shaft, comprising:
   a brake disc having two braking surfaces and mounted on the motor output shaft for rotation therewith;
   a pair of brake arm assemblies each having a movable brake arm having a first end and a second end and a brake shoe mounted on the first end of the brake arm, each of the brake arm assemblies being movably disposed in the vicinity of the brake disc for selective braking engagement of the brake shoes with the braking surfaces of the brake disc;
   a pair of brake springs for biasing the brake shoes on the brake arms toward the braking surfaces;
   a pair of levers, each of which is pivotally supported on an axis perpendicular to the axis of the output shaft, each of the levers having a first end and a second end engageable with the second end of one of the brake arms; and
   actuator means for engaging with the first ends of the levers and pivoting the levers about their respective axis, thereby separating the brake shoes from the brake disc against the force of the brake springs.

2. A brake unit for an elevator hoist apparatus as claimed in claim 1 wherein each brake spring is a coil spring having a longitudinal axis extending parallel to the motor output shaft.

3. A brake unit for an elevator hoist apparatus as claimed in claim 1 wherein the actuator means comprises an electromagnetic actuator.

* * * * *

Adverse Decisions in Interference

Patent No. 5,109,958, Kunio Kato, Yasumasa Iida, Takenobu Honda, Kazuhiko Sugita, Shinji Yamasaki, BRAKE UNIT FOR AN ELEVATOR HOIST APPARATUS, Interference No. 103,501, final judgment adverse to the patentees rendered January 23, 1997, as to claims 1-3.
*(Official Gazette May 25, 1999)*

Adverse Decisions in Interference

Patent No. 5,109,958, Kunio Kato, Yasumasa Iida, Takenobu Honda, Kazuhiko Sugita, Shinji Yamasaki, BRAKE UNIT FOR AN ELEVATOR HOIST APPARATUS, Interference No. 103,501, final judgment adverse to the patentees rendered January 23, 1997, as to claims 1-3.
*(Official Gazette June 8, 1999)*